United States Patent
Cheriton et al.

(10) Patent No.: US 7,062,658 B1
(45) Date of Patent: Jun. 13, 2006

(54) SECURE DIGITAL APPLIANCE AND METHOD FOR PROTECTING DIGITAL CONTENT

(75) Inventors: David Cheriton, Palo Alto, CA (US); Andy Bechtolsheim, Stanford, CA (US)

(73) Assignee: CISCO Technology, Inc, San Jose, CA (US)

( * ) Notice: Subject to any disclaimer, the term of this patent is extended or adjusted under 35 U.S.C. 154(b) by 713 days.

(21) Appl. No.: 09/955,436

(22) Filed: Sep. 10, 2001

Related U.S. Application Data (60) Provisional application No. 60/308,358, filed on Jul. 26, 2001.

(51) Int. Cl.
*G06F 11/30* (2006.01)
*G06F 12/14* (2006.01)
*G06Q 99/00* (2006.01)

(52) U.S. Cl. .................. 713/189; 713/193; 705/57
(58) Field of Classification Search ............ 705/57; 713/193
See application file for complete search history.

(56) References Cited

U.S. PATENT DOCUMENTS 5,825,879 A * 10/1998 Davis .................... 380/216
6,834,110 B1 * 12/2004 Marconcini et al. ......... 380/239

* cited by examiner

*Primary Examiner*—Thomas R. Peeso
*Assistant Examiner*—Kristin M. Derwich (57) ABSTRACT

A method and apparatus for protecting digital content. A secure digital appliance is disclosed for receiving communications coupled over a communication network. A private key of a private key and public key pair is stored in the secure digital appliance in such a way that the stored private key cannot be obtained by tampering with the secure digital appliance. Upon receipt of a session initiation message that is encrypted using the public key (of the private key and public key pair) the secure digital appliance decrypts the session initiation message using the stored private key to obtain a session key. The session key is then used to decrypt communications that include encrypted digital content. The secure digital appliance includes a local output device (e.g., a TV screen and/or speakers) that is operable to provide protected output of the digital content. The secure digital appliance does not contain any provision for output other than the protected output of digital content. Because the secure digital appliance does not allow for any output of the digital content other than the protected output, the end user cannot obtain a high quality digital copy of the digital content. Therefore, there is little chance that the security of digital content will be compromised.

15 Claims, 5 Drawing Sheets

SECURE DIGITAL APPLIANCE AND METHOD FOR PROTECTING DIGITAL CONTENT

This application claims the benefit of Provisional Application No. 60/308,358, filed Jul. 26, 2001.

TECHNICAL FIELD

This invention relates to the field of data transmission and encryption. More particularly, the present invention relates to a method and apparatus for protecting digital content.

BACKGROUND ART

The Internet and other communication networks now provide the capacity to deliver high-quality digital content such as video and sound to consumers. However, content providers, Hollywood studios and the like, are justifiably concerned about this content being copied and distributed illegally. In the past, proprietary scrambling approaches have been used for transmitting programming via cable and satellite. These proprietary scrambling approaches require control over the network from headend to set-top box. Though these proprietary scrambling approaches have been successful in the past, they are inappropriate for the Internet and other open protocol networks where interoperation is based on open protocols.

Various other proposals such as those of the Digital Video Broadcasting (DVB) standard add a slot for receiving a smart card or a Personal Computer Memory Card International Association (PCMCIA) card to the end use device. This allows for multiple different content provider encryption schemes to be used by the consumer inserting different cards into the end device. However, these schemes are expensive to provide and still just allow multiple proprietary schemes. Moreover, there is no assurance that the end-use device will prevent the digital content from being copied at the receiving end. For example, there is no assurance that the set-top box is not connected to a video or audio recording device for making high-quality digital copies.

One recent approach that facilitates receipt of digital content over open protocols is public key encryption. Public key encryption is a technique for secure communication, digital signatures and authentication. However, normally, public key encryption is associated with an end-user. Moreover, it is normally used in the situation where the end-user is able to receive and keep the unencrypted digital data. Also, it is normally used in the context of handling two-direction communication whereas a TV and/or stereo is normally a receive-only device relative to the network.

What is needed is a method and apparatus that will provide protection of digital content. Also, a method and apparatus is needed that prevents end users from making high-quality digital copies of transmitted digital content. The present invention meets the above needs.

DISCLOSURE OF THE INVENTION

The present invention includes a method and apparatus that provides for protection of digital content. Moreover, the method and apparatus of the present invention prevents end users from making high quality digital copies of received digital content.

A secure digital appliance is disclosed for receiving communications coupled over a communication network. A private key of a private key and public key pair is stored in the secure digital appliance in such a way that the stored private key may not be obtained by tampering with the secure digital appliance. The secure digital appliance is operable to decrypt a session initiation message using the stored private key for obtaining a secret key (the session key). Encrypted digital content is then decrypted using the session key so as to obtain the digital content. The secure digital appliance allows only for protected output of digital content. In the present embodiment the secure digital appliance includes a local output device (e.g., a TV screen and/or speakers) that is operable to exhibit the digital content. In the present embodiment, the secure digital appliance does not contain any provision for output other than the exhibition of digital content.

In the present embodiment, secure digital appliances are certified and public certificates are issued that indicate the level of protection provided by the secure digital appliance. This allows for easy determination of the level of protection provided by a particular secure digital appliance.

A method for protection of digital content is also disclosed. Upon receiving a request for digital content that identifies a secure digital appliance a determination is made as to whether the secure digital appliance provides adequate protection of the digital content. When the secure digital appliance provides adequate protection of the digital content (e.g., when a certificate is found that indicates adequate protection of digital content), the corresponding public key is determined. A session initiation message is then generated that includes a session key. The session initiation message is encrypted using the public key, and is sent to the secure digital appliance. The session key is used to encrypt the requested digital content that is sent to the secure digital appliance.

The encrypted session initiation message is decrypted at the secure digital appliance to obtain the session key. The encrypted digital content is then decrypted at the secure digital appliance using the session key so as to obtain the digital content. The use of a shared secret key (e.g., the session key) allows simple, fast decryption of content. The secure digital appliance then provides for protected output of the digital content. In the present embodiment, protected output includes exhibition of the digital content using a display device that is integrally disposed within the housing of the secure digital appliance. Because the secure digital appliance does not allow for any output of the digital content other than protected output, the end user cannot obtain a high quality digital copy of the digital content. Therefore, there is little chance that the security of the digital content has been compromised.

In another embodiment of the present invention, in addition to the session initiation message, working key messages are generated that contain working keys. The working key messages are encrypted and decrypted using the session key. Digital content is divided into small segments of digital content that are encrypted and decrypted using the working keys. Because only small segments of digital content are encrypted using a given working key, there is little sample cyphertext available to an attacker, reducing the attacker's ability to crack the encryption. This provides powerful protection because, even if a segment of digital content is intercepted and decrypted, it only allows for access to a small segment of the digital content that is being transmitted.

In another embodiment, a method and apparatus is disclosed in which both a secure digital appliance and a set-top box are used for protection of digital content.

Accordingly, the present invention provides a method and apparatus that provides for protection of digital content.

Also, the present invention prevents end users from making high quality digital copies of received digital content. Moreover, the present invention allows for the use of an open protocol for establishing a secure content-protection channel to certified devices, and provides a simple means for ensuring that digital content is only sent to devices that provide adequate protection of digital content. Moreover, the present invention allows for appliances to be produced, independent of particular service providers, without requiring a customized approached such as the smartcard slots of prior art methods.

In addition, the present invention allows for the separation of customer authentication and verification from content protection, thereby allowing a customer to order content on someone else's TV and still have it charged to his own account.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout the present Application, discussions utilizing terms such as "determining," "sending," "encrypting," "decrypting," "exhibiting," or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Figure 1:
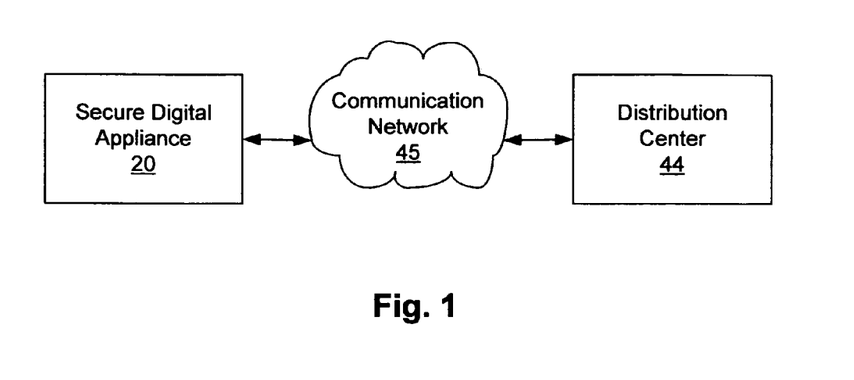
FIG. 1 is a diagram that illustrates an exemplary system for protecting digital content that includes a secure digital appliance and a distribution center in accordance with one embodiment of the present invention.

Referring now to FIG. 1, a system for protecting digital content is illustrated that includes secure digital appliance 20 that is communicatively coupled with a distribution center 44 via communication network 45. Communication network 45 can include the Internet and can include any of a number of different communications systems such as the Plain Old Telephone System (POTS), wireless communication systems (e.g., cellular telephone communication systems and paging systems) and may include one or more Local Area Network (LAN), Wide Area Network (WAN), or other communication system, and may use Ethernet, Transmission Control Protocol/Internet Protocol (TCP/IP), HyperText Transfer Protocol (HTTP) or other communication protocol.

Figure 2:
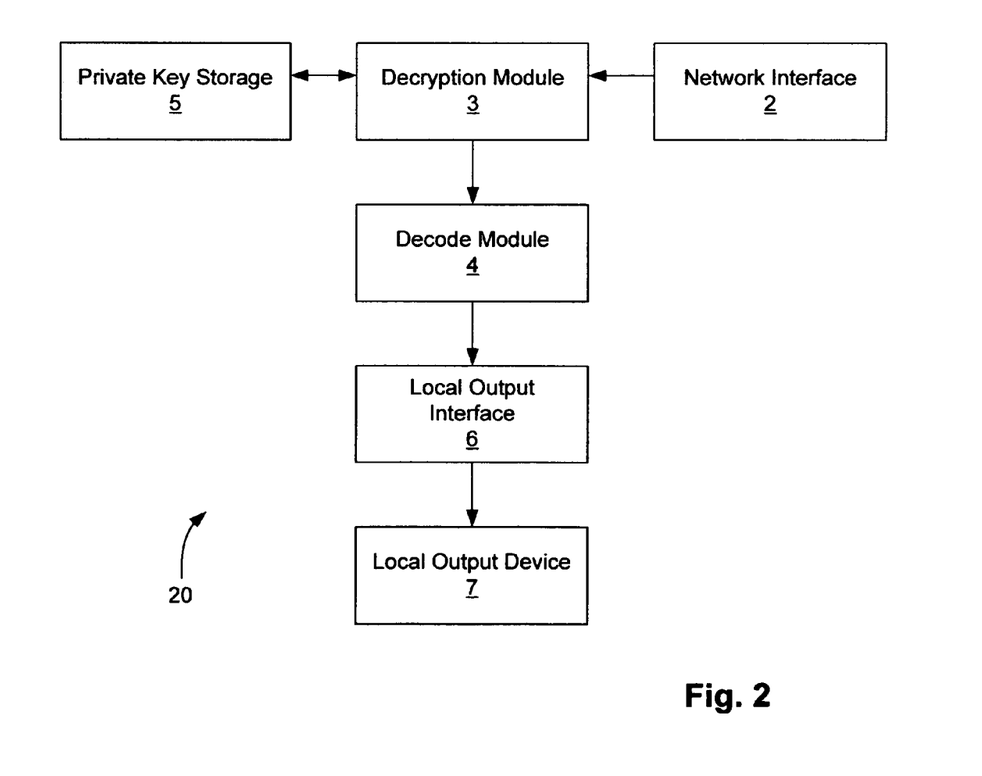
FIG. 2 is a diagram that illustrates the functional components of a secure digital appliance in accordance with one embodiment of the present invention.

FIG. 2 shows an embodiment of secure digital appliance 20 that includes network interface 2 for receiving communications coupled over a communication network. More particularly, network interface 2 couples a secure digital appliance 20 to a communication network such as communication network 45 of FIG. 1. In the present embodiment, network interface 2 includes a telephone modem for communicating with other electronic devices. However, alternatively, network interface 2 could use any of a number of well known communication standards and protocols such as FireWire (IEEE 1394), parallel, small computer system interface (SCSI), infrared (IR) communication, Bluetooth wireless communication, Ethernet, TCP/IP, HTTP, etc.

Secure digital appliance 20 also includes provision for private key storage, shown as private key storage 5. Private key storage 5 is operable to securely store a private key of a private key and public key pair. In the present embodiment, the private key is encoded in secure digital appliance 20 such that it cannot be extracted. In one embodiment, the private key is encrypted and partitioned into several different locations and technologies within secure digital appliance 20, including various portions of random logic. In another embodiment, secure digital appliance 20 is tamper-proof such that it will destruct internally, at a minimum erasing any indication of the private key if secure digital appliance 20 is tampered with or is modified in any way.

Continuing with FIG. 2, secure digital appliance 20 includes decryption module 3 that is coupled to network interface 2 and that is coupled to private key storage 5. Decryption module 3 is operable upon receipt of a message that is encrypted using the public key (of the private key and public key pair) to decrypt the message using the private key stored in private key storage 5. Decryption module 3 is also operable to decrypt encrypted digital content that is received at network interface 2.

In the present embodiment, secure digital appliance 20 includes decode module 4 that is coupled to decryption module 3. Decode module 4 is operable to decode digital content when digital content is received that is encoded. In the present embodiment, digital content is encoded using a MPEG (Motion Pictures Experts Group) standard, and decode module 3 is operable to decode the received encoded digital content. It is appreciated that decoding typically includes decompression of any compressed digital data.

Continuing with FIG. 2, in the present embodiment, secure digital appliance 20 includes a local output interface 6. Local output interface 6 is coupled to decode module 4. In the present embodiment, local output interface 6 provides output as a high-quality analog signal such as RGB. However, alternatively, output can be in any of a number of different forms so long as secure digital appliance 20 provides protection such that the output cannot be copied.

Still referring to FIG. 2, secure digital appliance 20 also includes local output device 7 that is coupled to local output interface 6. Local output device 7 is operable to provide protected output of digital content. In the present embodiment local output device 7 is operable to exhibit digital content. In one embodiment, local output device 7 includes a television screen for visual display and includes one or more audio output device (e.g., a speaker) for exhibiting audio. However, local output device 6 can be any mechanism for exhibiting content such as, for example, a cathode ray tube (CRT), flat panel liquid crystal display (LCD), field emission display (FED), or any other display device suitable for displaying video and/or graphic images and alphanumeric characters recognizable to a user or for emitting sound.

Secure digital appliance 20 is designed and manufactured such that the digital content cannot be copied. In the present embodiment, all of components 2-7 of secure digital appliance 20 are disposed within a single tamper-proof housing. At a minimum, the housing is difficult to open, and does not allow for easy access to components 2-7 of secure digital appliance 20. Secure digital appliance 20 does not contain any provision for output other than the protected output provided by local output device 7. Therefore, a user cannot copy the digital content that is provided to secure digital appliance 20.

The term "protected output" as used in the present Application includes only those types of output that impose a significant impediment to creating an exact or high-quality digital copy (e.g., output that cannot be exactly or nearly exactly copied) such as, for example, exhibition (e.g. display on a television monitor and/or sound broadcast by speakers). Other forms of protected output include performances using visual display mechanisms and audio output mechanisms that are degraded in quality so as to prevent accurate copies from being made. In one embodiment, protected output is provided by the use of a protected output connection mechanism. The protected output connection mechanism only allows for connection thereto using a corresponding authorized connection mechanism that is used by other devices that allow for protected output. By allowing only makers of devices that allow for protected output to use the corresponding authorized connection mechanism, protection of digital content is provided.

In one embodiment, local output device 7 provides protected output in the form of output to one or more external device that provides for protection of digital content. The protected output can be protected by encryption, encoding, specialized connection hardware, etc. In one embodiment, protected output is provided by reencrypting digital content in such a way that the encrypted digital content can be unencrypted by the receiving secure appliance and by using a secure output connection mechanism. In one embodiment, the secure digital appliance includes a protected output connector receptacle that mates with a corresponding connector on other devices that provide the required security. In this way, multiple levels of security can be obtained by connecting multiple secure devices to each other.

In one embodiment of the present invention, secure digital appliance 20 includes an integrated circuit device such as, for example, an Application Specific Integrated Circuit (ASIC) device. In this embodiment, private key storage 5, decryption module 3, and decode module 4 are disposed in the integrated circuit device. Thus, in this embodiment, all of the confidential information that is required for decrypting and decoding the digital content is contained within an integrated circuit device. This makes the private key extremely difficult to obtain.

Figure 3:
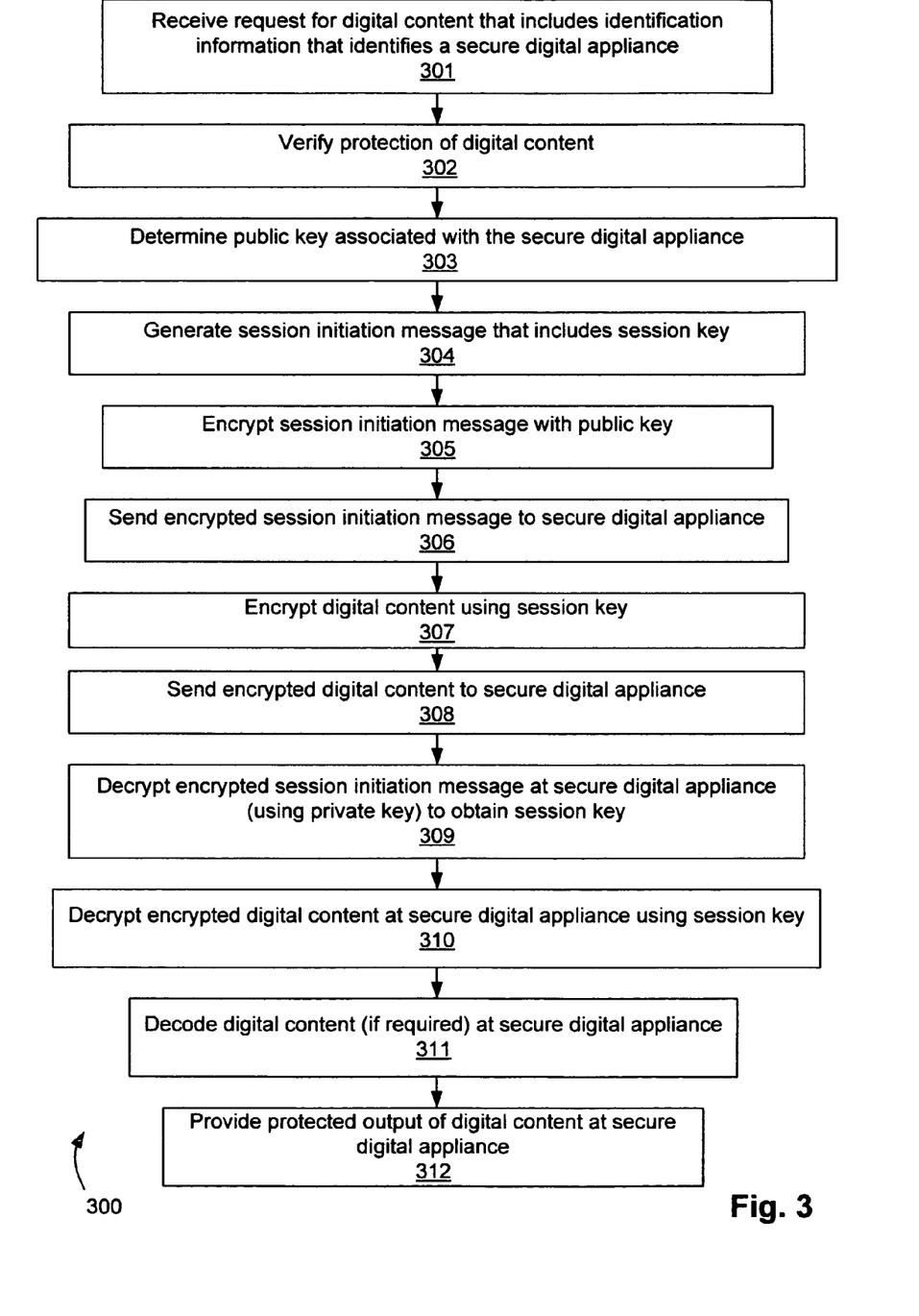
FIG. 3 is a flow chart that illustrates a method for protecting digital content in accordance with one embodiment of the present invention.

FIG. 3 illustrates a method 300 for protecting digital content. As shown by steps 301–302, upon receiving a request for digital content (step 301) that includes identification information that identifies a secure digital appliance that contains a private key of a private key and public key pair, the corresponding public key is determined (step 302). In the embodiment illustrated in FIG. 1, the request is received at distribution center 44. In the present embodiment, the request is generated by the operation of a user's remote control so as to cause the secure digital appliance to send a request for digital content that is received electronically by a remote computing device. The remote-computing device either automatically processes the request, or makes the request available to a human operator who is responsible for processing the request. In an alternate embodiment, the request is made by the user initiating a telephone call to an operator who communicates directly with the requesting party via telephone. In yet another embodiment, a telephone call is initiated by the user that is answered using an automated call processing system that automatically processes the request without the use of a human operator.

Referring now to step 302, protection of digital content is verified. More particularly, in the present embodiment, a determination is made as to whether the secure digital appliance will provide adequate protection of the digital content. In one embodiment, determination of protection of digital content is determined by mapping the received identification information to a corresponding public key contained within a secure database.

In one embodiment of the present invention, the secure database includes data that corresponds to public certificates that certify the level of protection provided by the particular appliance. In this embodiment, secure digital appliances are certified and certificates are issued that indicate the level of protection provided by the secure digital appliances and that identify the public key of the secure digital appliances. In this embodiment, the determination as to whether the corresponding secure digital appliance provides adequate protection of digital content is made by searching the secure database (or looking up the certificate) to find the identifying information that corresponds to the secure digital appliance. If the secure digital appliance does not provide the level of protection required for the particular digital content requested (e.g., is not found in the database), the customer is notified of this fact and the digital content is not sent to the customer.

When the secure digital appliance is determined to provide adequate protection of the digital content, the public key associated with the secure digital appliance is determined by mapping the received identification information to a corresponding public key contained within a secure database. In the present embodiment, the term "secure database" refers to a database that includes public keys that correspond to devices that provide protection of digital content. In one embodiment of the present invention, the secure database includes data that corresponds to public certificates that certify the level of protection provided by the particular appliance. The secure database gives the public key associated with the secure digital appliance. The identification information can be the make and model of the secure digital appliance and/or the serial number or other identifying number associated with the secure digital appliance.

In the present embodiment, the request also includes information that allows the operator to charge the requesting party for the desired digital content. This can be simply informing the operator of which account is to be charged, providing credit card information, etc. The payment mechanism is independent of the security of the content; and, thereby, does not in any way affect the security of the content. In addition, because the payment mechanism is independent of the security of the content, it is easy for one person to order and pay for digital content that is to be sent to another person's secure communication appliance. Thereby, one customer can order digital content to be exhibited on someone else's secure digital appliance and still have the digital content charged to that customer's account.

In the present embodiment, a single secure database is used both for verifying protection of digital content and determining the public key of the private key/public key pair. However, alternatively, two or more different databases could be used. The secure database can be stored within a remote computing device as either volatile or non-volatile memory or can be stored on a local storage device such as a disk, optical disk, floppy disk, etc. The secure database can be accessed by a human operator for verifying protection, or can be automatically accessed by a computing device.

A first digital message referred to hereinafter as a "session initiation message" or a "ticket" is generated and is sent to the secure digital appliance as shown by steps 304–306. More particularly, as shown by step 304, a session initiation message is generated that includes a first secret key. This first secret key is referred to hereinafter as a "session key." As shown by step 305, the session initiation message is encrypted with the public key determined in step 303. The session initiation message is then sent to the secure digital appliance as shown by step 306.

The session key is used to encrypt the requested digital content as shown by step 307. The encrypted digital content is then sent to the secure digital appliance as shown by step 308.

In the embodiment shown in FIG. 2, steps 303–308 of FIG. 3 are performed at distribution center 44. Thereby, a session initiation message and encrypted digital content are transmitted via communication network 45 to secure digital appliance 20. However, alternatively, some of steps 303–308 could be performed at other locations such as, for example, centralized or distributed call centers and/or processing centers.

Referring now to step 309, the encrypted session initiation message is decrypted at the secure digital appliance so as to obtain the session key. In the embodiment shown in FIG. 2, the encrypted session initiation message is received at network interface 2. Decryption module 3 is operable to decrypt the message using the private key stored in private key storage 5.

As shown by step 310, the encrypted digital content is then decrypted at the secure digital appliance using the session key so as to obtain the digital content. In the embodiment shown in FIG. 2, decryption module 3 is operable to decrypt encrypted digital content that is received at network interface 2 using the session key.

Continuing with FIG. 3, as shown by step 311, the decrypted digital content is decoded when said digital content requires decoding. This allows for use of any of a number of known encoding schemes such as, for example, decoding schemes that use the MPEG (Motion Pictures Experts Group) standard. It is appreciated that decoding includes decompression of any compressed digital data. In the embodiment shown in FIG. 2, decode module 4 is operable to decode any digital content that requires decoding.

Continuing with FIG. 3, protected output of digital content is provided. In one embodiment, the digital content is exhibited at the secure digital appliance as shown by step 312. Thus, for example, when the secure digital appliance includes a television monitor and one or more speakers, the digital content (e.g., a movie) is exhibited by displaying the requested video on the television monitor and emitting the corresponding sound through the speaker(s). Because the secure digital appliance does not allow for any output of the digital content other than the protected output, there is little chance that the security of the digital content has been compromised.

Because public key encryption is only used on session initiation (to decrypt the session initiation message), such as upon powering up the secure digital appliance or on start of play of a movie or show, the decryption of public key encryption in the device need not be fast. In addition, only a small amount of public key encryption is required, making the start-up process relatively quick. Also, the use of a shared secret key (e.g., the session key) gives simple, fast decryption of content.

Figure 4:
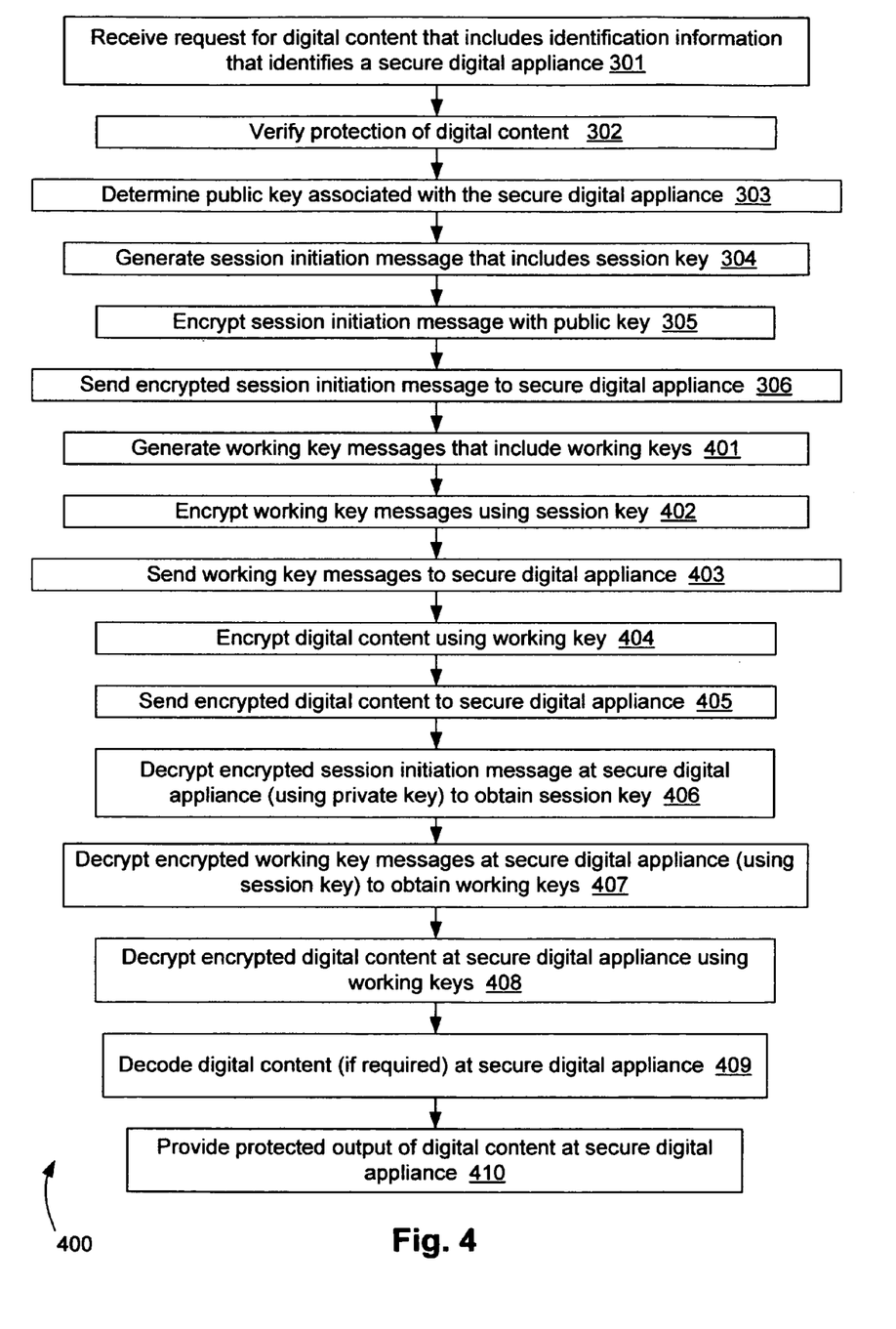
FIG. 4 is a flow chart that illustrates a method for protecting digital content in which one or more working keys are used in accordance with one embodiment of the present invention.

FIG. 4 shows a method 400 that includes an additional level of encryption for protection of digital content. As in the embodiment shown in FIG. 3, upon receiving a request for digital content that includes identification information that identifies a secure digital appliance (step 301), protection of digital content is verified (step 303) and the corresponding public key is determined (step 302). A first digital message or "session initiation message" is generated (step 304), encrypted (step 305) using the public key, and is sent to the secure digital appliance (step 306) when the digital content is determined to provide adequate protection of the digital content.

Referring now to step 401, one or more additional digital messages, referred to herein as "working key messages" are generated that contain additional secret keys referred to herein as "working keys." More particularly, in the present embodiment each working key message includes a single working key. However, alternatively, multiple working keys could be included in a single working key message.

As shown by step 402, each of the working key messages are encrypted using the session key. Referring now to step 403, the working key messages are sent to the secure digital appliance.

Digital content is then encrypted using the working keys as shown by step 404 and is sent to the secure digital appliance as shown by step 405. In the embodiment shown in FIG. 2, steps 401–405 of FIG. 4 are performed at distribution center 44. Thereby, working key messages and digital content are generated, encrypted, and transmitted, via communication network 45, to secure digital appliance 20. However, alternatively, some of steps 401–405 could be performed at other locations such as, for example, centralized or distributed call centers and/or processing centers.

Referring now to step 406, the encrypted session initiation message is decrypted at the secure digital appliance (using the private key) so as to obtain the session key. In the embodiment shown in FIG. 2, the encrypted session initiation message is received at network interface 2. Decryption module 3 is operable to decrypt the message using the private key stored in private key storage 5.

The working key messages are decrypted at the secure digital appliance to obtain the working keys as shown by step 407. In the embodiment shown in FIG. 2, upon receiving working key messages that are encrypted with the session key and that include working keys, decryption module 3 is operable to decrypt the working key messages to obtain the working keys.

Referring now to step 408, the encrypted digital content is decrypted at the secure digital appliance using the working keys to obtain the digital content. When required, the digital content is decoded as shown by step 409. Protected output of digital content is then provided as shown by step 410 at the secure digital appliance. Because the secure digital appliance does not allow for any output of the digital content other than protected output (e.g. exhibition), exact digital copies of the digital content cannot be made.

In one embodiment, method 400 of FIG. 4 is performed using a single working key message that includes a single working key. This working key message is encrypted using the session key (step 402) and is sent to the secure digital appliance (step 403) where it is decrypted to obtain the working key (step 407). The digital content is encrypted using the single working key (step 404) and is sent to the secure digital appliance (step 405). At the secure digital appliance the encrypted digital content is then decrypted (step 408) using the single working key to obtain the digital content.

In another embodiment, method 400 of FIG. 4 is performed using a plurality of working key messages that include working keys. These working key messages are encrypted using the session key (step 402) and are sent to the secure digital appliance (step 403). The digital content is encrypted using the working keys (step 404) and is sent to the secure digital appliance (step 405). At the secure digital appliance the session initiation message is decrypted (step 406) to obtain the session key. The session key is then used to decrypt the working key messages to obtain the working keys (step 407). The working keys are then used to decrypt the encrypted digital content (step 408).

In one embodiment, MPEG-2 encoding is used and the standard ECM message is used to deliver working keys. In this embodiment, the working keys are included in the private data portion of the ECM message.

In one embodiment in which multiple working keys are used, the working keys are used in a sequential manner to sequentially decrypt the digital content. That is, sequential digital messages are sent, with each digital message including a different working key. Encrypted digital content (that is encrypted using the previously sent working key) follows each digital message. For example, in one embodiment, the digital content is broken up into digital content segments, with each digital content segment including a small portion of digital content (e.g., 5 seconds of a movie). This provides powerful protection because, even if a segment of digital content is intercepted and decrypted, it only allows for access to a small portion of the digital content. In addition, because each digital content segment is short, decryption is almost impossible without knowledge of the working key that was used to encrypt the digital content segment.

Figure 5:
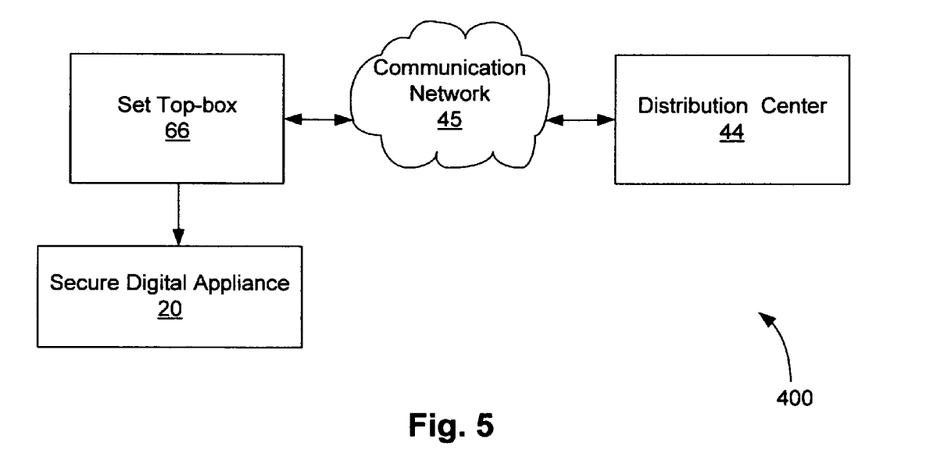
FIG. 5 is a diagram that illustrates an exemplary system for protecting digital content that includes a set-top box, a secure digital appliance, and a distribution center in accordance with one embodiment of the present invention.
Figure 6:
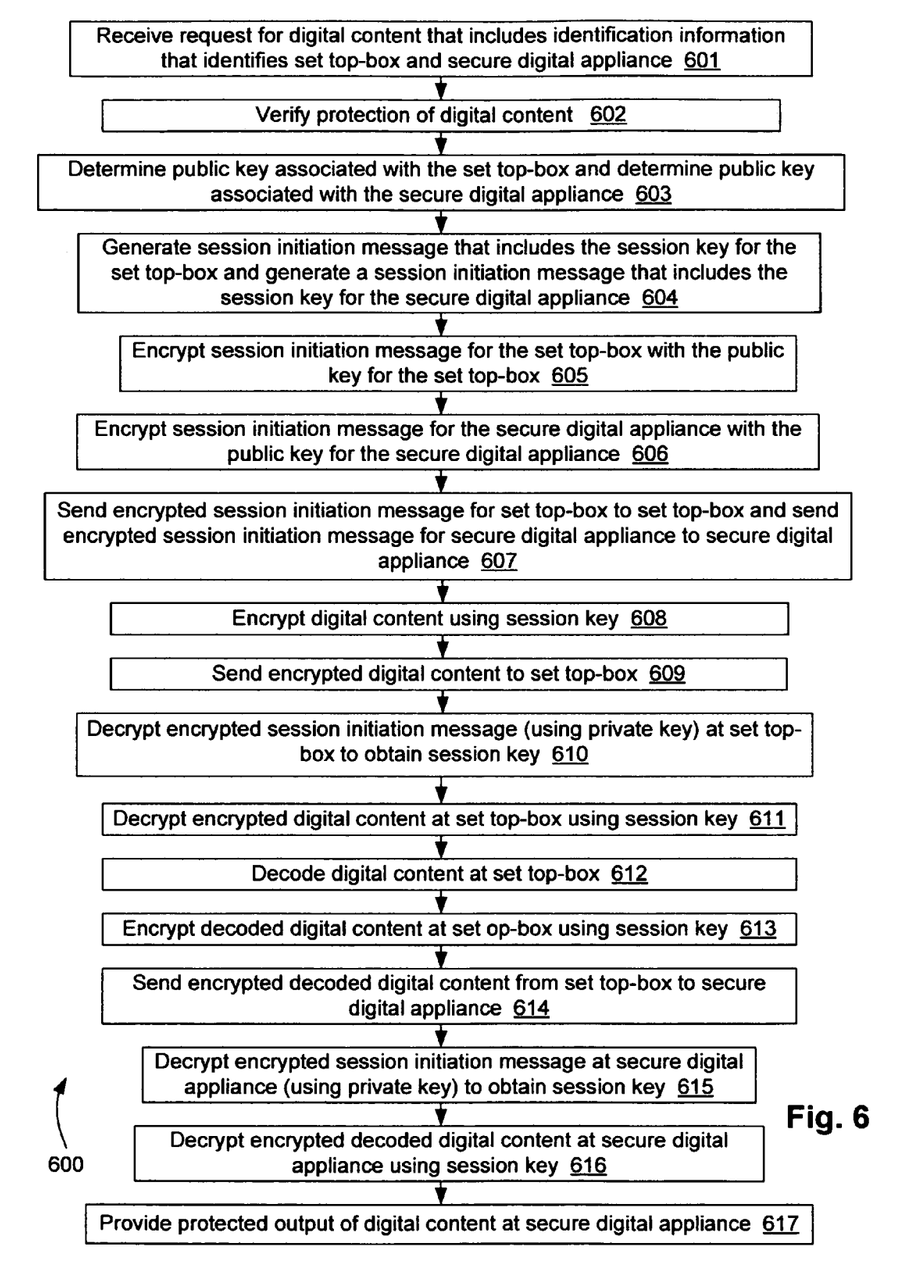
FIG. 6 is a flow chart that illustrates a method for protecting digital content in which digital content is provided to a secure digital appliance through a set-top box in accordance with one embodiment of the present invention.

FIGS. 5–6 illustrate a method and apparatus in accordance with one embodiment of the present invention in which both a secure digital appliance and a set-top box are used for protection of digital content. Referring now to FIG. 5, an exemplary network 500 is shown that includes distribution center 44 that is coupled to set-top box 56 via communication network 45. Set-top box 56 is coupled to secure digital appliance 20. In the present embodiment, set-top box 56 is coupled directly to secure digital appliance 20 via an electrical cable that attaches to network interface 2 of FIG. 2.

Continuing with FIG. 5, set-top box 56 includes provision for storing a private key of a private key and public key pair and includes logic for decrypting messages using the private key. In addition, set-top box 56 includes logic for decoding messages that are encoded. In the present embodiment, set-top box 56 is operable to receive and decrypt session initiation messages that are encoded using the public key for the set-top box. Also, set-top box 56 is operable to receive, decrypt and decode encrypted digital content. Set-top box 56 is also operable to encrypt the decoded digital content and send the encrypted decoded digital content to a secure digital appliance. In the present embodiment, set-top box 56 is operable to forward encrypted session initiation messages for the secure digital appliance to the secure digital appliance 20.

Referring now to FIG. 6, a method 600 for assuring protection of digital content is shown that utilizes both a secure digital appliance and a set-top box. As shown by step 601, a request for digital content is received that includes identification information that identifies a secure digital appliance and identification information that identifies a set-top box. In the present embodiment, the request is generated by the operation of a user's remote control so as to cause the secure digital appliance to send a request for digital content that is received electronically by a remote computing device. The remote-computing device either automatically processes the request, or makes the request available to a human operator who is responsible for processing the request. In an alternate embodiment, the request is made by the user initiating a telephone call to an operator who communicates directly with the requesting party via telephone. In yet another embodiment, a telephone call is initiated by the user that is answered using an automated call processing system that automatically processes the request without the use of a human operator. In the embodiment illustrated in FIG. 5, the request is communicated via communication network 45 and is received at a remote computing device located at distribution center 44.

In the present embodiment, the request also includes information that allows the operator to charge the requesting party for the desired digital content. This can be simply informing the operator of which account is to be charged, receiving credit card information, etc. The payment mechanism is independent of the security of the content; and, thereby, does not in any way affect the security of the content.

Referring now to step 602, protection of digital content is verified. More particularly, in the present embodiment, a determination is made as to whether the secure digital appliance will provide adequate protection of the digital content. In one embodiment a secure database is searched using the received identification information. Alternatively, the public certificate is located that corresponds to the secure digital appliance and the public certificate is analyzed to determine the level of protection that is indicated to be provided by the secure digital appliance. When the secure database or the certificate indicates that the corresponding secure digital appliance provides adequate protection, the content provider will know that the corresponding secure digital appliance provides adequate protection of digital content (e.g., is tamper-proof). If the secure digital appliance does not provide the level of protection required for the particular digital content requested, the customer is notified of this fact and the digital content is not sent to the customer.

Also, a determination is made as to whether the set-top box will provide adequate protection of the digital content. In one embodiment, the secure database is searched using the received identification information. Alternatively, the public certificate is located that corresponds to the set-top box and the public certificate is analyzed to determine the level of protection that is indicated to be provided by the set-top box. When the secure database or the certificate indicates that the corresponding set-top box provides adequate protection, the content provider will know that the corresponding set-top box provides adequate protection of digital content (e.g., is tamper-proof). If the set-top box does not provide the level of protection required for the particular digital content requested, the customer is notified of this fact and the digital content is not sent to the customer.

When the secure digital appliance and the set-top box are determined to provide adequate protection of the digital content, the public key for the secure digital appliance and the public key for the set-top box are determined as shown by step 603.

In the present embodiment, public keys are determined by mapping the received identification information to a secure database that includes the public key associated with the secure digital appliance. Alternatively, the received identification information is mapped to a corresponding public key encryption certificate that gives the public key associated with the secure digital appliance. The identification information can be the make and model of the secure digital appliance and/or the serial number or other identifying number associated with the secure digital appliance. Similarly, the public key associated with the set-top box is determined by mapping the received identification information to a secure database that includes the public key associated with the set-top box. Alternatively, the received identification information is mapped to a corresponding public key encryption certificate that gives the public key associated with the set-top box. In the present embodiment, the identification information for the set-top box is the make and model of the set-top box. However, alternatively, the serial number or other identifying number associated with the set-top box can be used.

A first digital message referred to hereinafter as a "session initiation message" or a "ticket" is generated as shown by step 604. In the present embodiment, two copies of the first digital message are generated. More particularly, a first session initiation message is generated for the set-top box and a second session initiation is generated for the secure digital appliance. In the present embodiment, these two session initiation messages are identical. However, alternatively, they can be different. Both session initiation messages include a first secret key, referred to hereinafter as a "session key."

As shown by step 605, the session initiation message for the set-top box is encrypted with the public key for the set-top box determined in step 602. As shown by step 606, the session initiation message for the secure digital appliance is encrypted with the public key for the secure digital appliance determined in step 603.

The encrypted session initiation message for the set-top box is then sent to the set-top box as shown and the encrypted session initiation message for the secure digital appliance is sent to the secure digital appliance as shown by step 607. In the present embodiment, the both session initiation messages are sent to the set-top box, which then sends the session initiation message for the digital appliance to the secure digital appliance.

Digital content is then encrypted using the session key as shown by step 608. The encrypted digital content is then sent to the set-top box as shown by step 609. It is appreciated that the encrypted digital content can be sent in a single packet, or can be sent in a number of different packets containing encrypted digital content.

The set-top box decrypts the encrypted session initiation message for the set-top box as shown by step 610 using the private key of the private key/public key pair for the set-top box to obtain the session key.

The encrypted digital content is decrypted at the set-top box using the session key as shown by step 611. As shown by step 612, the decrypted digital content is decoded. The decoding process includes decompression of the digital content. As shown by step 613, decoded digital content is encrypted using the session key. More particularly, the set-top box encrypts the digital content using the session key to obtain encrypted decoded digital content.

The encrypted decoded digital content is sent to the secure digital appliance as shown by step 614. The encrypted session initiation message is decrypted at the secure digital appliance (using the private key for the secure digital appliance) so as to obtain the session key (step 615). The encrypted digital content is then decrypted at the secure digital appliance using the session key (step 616) so as to obtain the digital content. Protected output of the digital content is then provided at the secure digital appliance as shown by step 617. Because the secure digital appliance does not allow for any output of the digital content other than the protected output, there is little chance that the security of the digital content has been compromised.

In one embodiment method 600 for assuring protection of digital content is performed using the working key messages and working keys of method 400 of FIG. 4. More particularly, after steps 601–609 of FIG. 6 have been performed to generate and send a first session initiation message to the set-top box, and after the session initiation message is decrypted to obtain the session key (step 610), an additional level of security is provided by using the methodology of steps 401–410 of FIG. 4 to obtain protected output of digital content at the secure digital appliance.

More particularly, one or more working key messages are generated that contain working keys and that are encrypted using the session key. The working key messages are sent to the set-top box and are sent to the secure digital appliance. Digital content is then encrypted using the working keys and is sent to the set-top box. The digital content is decrypted at the set-top box and is decoded at the set-top box. The set-top box then encrypts the decoded digital content and sends it to the secure digital appliance.

At the secure digital appliance, the encrypted session initiation message is decrypted using the private key so as to obtain the session key. The working key messages are then decrypted at the secure digital appliance (using the session key) to obtain the working keys. The encrypted decoded digital content is decrypted at the secure digital appliance using the working keys to obtain the digital content. Protected output of the digital content is then provided (e.g. exhibition of the digital content) at the secure digital appliance. Because the secure digital appliance does not allow for any output of the digital content other than the protected output, exact digital copies of the digital content cannot be made.

When the session initiation message of methods 300, 400, 600 and 700 includes a time stamp, the exhibition of the digital content is only allowed during the time indicated by the time stamp. In the present embodiment, a clock embedded within and protected within the secure digital appliance is used to assure that exhibition of digital content only occurs during the allowed time interval. In one embodiment, each session key is associated with a particular time interval; thereby, use and replay is limited to only the time interval indicated. In one embodiment, the time interval is indicated by two timestamps, a first timestamp that indicates start time and a second timestamp that indicates end time. When the time interval has expired, the customer must reorder the digital content.

Though the clock on the secure digital appliance clock can be a conventional clock that is set to accurate time, there is no need for accurate determination of the current time. In one embodiment, the clock on the secure digital appliance either is stopped or advances (and never runs backwards). Thereby, no battery backup is required as a part of the secure digital appliance. In this embodiment, the clock is a montonically non-decreasing clock. In the present embodiment, the non-decreasing clock periodically increments in real-time when powered on, saving its time periodically to non-volatile memory that provides no means to be set at an earlier time. When the clock receives a session initiation message that specifies a start time that is later than the clock of the secure digital appliance, it is typically because the clock of the secure digital appliance has not been running at some point (e.g. because it was not powered on). The clock on the secure digital appliance can either be allowed to advance to the received start time or the content will not be played. In this manner, the secure digital appliance need not maintain accurate time on its clock when powered down, but can still prevent arbitrary replay of content.

Moreover, though the methods of the present invention are described with reference to communication with a distribution center over a communication network, the present invention is well adapted for protecting digital content using other types of infrastructure and/or devices. In one embodiment, tickets are stored on a stored on a local storage device such as a disk, optical disk, floppy disk, etc. that is accessible to the secure digital appliance. Also, the secure database can be stored in the same or a different medium and can be accessed by the secure digital appliance. In one alternate embodiment, tickets and a secure database are stored on the digital appliance itself.

The method and apparatus of the present invention allows for flexible configuration of programming. For example, in one embodiment of the present invention, a long-term key (e.g., several days) is used for applications such as cable television subscriber video services. Thus, a session initiation message only needs to be sent every few days. However, for video-on demand, a session initiation message is required for each movie that is ordered.

In one embodiment of the present invention, a long-term key (e.g., several days) is used for receiving a subscription broadcast service. A new session initiation message only needs to be sent every few days. A second session initiation message is then sent for each show or film that is broadcast, with the second session initiation message encrypted with the session key contained within the first session initiation message (the long-term key), with the session key contained within the first session initiation message shared across many or all of the secure digital appliances. The second session initiation message specifies a shorter time interval, which can be the just long enough to receive its associated show or film in real-time. The session key contained in the second session initiation message is used to decrypt the protected content, either directly or indirectly using the working key messages and working keys. Using this scheme, the same content and session initiation message can be broadcast to all customers, yet prevent them from replaying the content without permission (because the second-level session initiation message time period expires). However, each customer is free to store the protected content and request a subsequent customer-specific session initiation message to play the protected content again at a later time. For instance, the Superbowl can be broadcast as it is played yet customers are charged to replay it at a later time.

Moreover, in one embodiment of the present invention, more than two levels of session initiation messages are used. In an embodiment of the present invention three session initiation messages are required for playing a particular program. These multiple session initiation messages can be used in conjunction with a single secure digital appliance, a set-top box and a secure digital appliance, a chain of secure digital appliances, or one or more secure digital appliance that are coupled to other secure devices for providing protected output.

The methods of the present embodiment are also well adapted for enabling a user to play locally stored protected content. Thereby content can be received and stored locally (e.g., on the secure digital appliance). However, exhibition is only allowed upon requesting, and receiving a session initiation message or messages that include required keys for decoding the locally stored content.

Accordingly, the present invention provides a method and apparatus that provides for protection of digital content. Also, the present invention prevents end users from making high quality digital copies of received digital content. Moreover, the present invention allows for the use of an open protocol for establishing a secure content-protection channel to certified devices, and provides a simple means for ensuring that digital content is only sent to devices that provide adequate protection of digital content. Moreover, the present invention allows for appliances to be produced, independent of particular service providers, without requiring a customized approach such as the smartcard slots of conventional methods.

In addition, the present invention allows for the separation of customer authentication and verification from content protection, thereby allowing a customer to order content to be exhibited on someone else's secure digital appliance and still have it charged to the customer's own account.

The preferred embodiment of the present invention, a method and apparatus for protecting digital content, is thus described. While the present invention has been described in particular embodiments, it should be appreciated that the present invention should not be construed as limited by such embodiments, but rather construed according to the below claims.

We claim:

1. A secure digital appliance comprising:
   a network interface for receiving communications coupled over a communication network;
   provision for private key storage, said provision for private key storage operable to securely store a private key of a private key and public key pair;
   a decryption module coupled to said network interface and coupled to said provision for private key storage, said decryption module operable upon receiving a message that is encrypted using said public key to decrypt said message using said private key for obtaining a first secret key, said decryption module also operable to decrypt encrypted digital content that is received at said network interface using said first secret key so as to obtain digital content, wherein, upon receiving additional digital messages that are encrypted with said first secret key and that include additional secret keys, said decryption module is operable to decrypt said additional digital messages to obtain said additional secret keys, and further wherein, upon receiving digital content that is encrypted using said additional secret keys, said decryption module is operable to decrypt said encrypted digital content using ones of said additional secret keys so as to obtain said digital content; and
   a local output device coupled to said decryption module, said local output device operable to provide protected output of said digital content, said secure digital appliance not allowing for any output of said digital content other than said protected output wherein said protected output provides for exhibition of said digital content and said secure digital appliance does not contain any provision for output other than said exhibition of said digital content.

2. The secure digital appliance of claim 1 further comprising:
   a decode module coupled to said decryption module and operable to decode said digital content when said digital content is encoded; and
   a local output interface coupled to said decode module and coupled to said local output device for output of said decoded digital content.

3. The secure digital appliance of claim 1 further including:
   an integrated circuit device, said provision for private key storage, said decryption module and said decode module included in said integrated circuit device.

4. The secure digital appliance of claim 1 wherein, upon receiving a message that includes one or more time stamp, said secure digital appliance is operable to only exhibit said digital content during the time indicated by said one or more time stamp.

5. A method for protecting digital content comprising:
   upon receiving a request for digital content that identifies a secure digital appliance that contains a private key of a private key and public key pair, determining said public key;
   sending a first digital message to said secure digital appliance, said first digital message encrypted with said public key and said first digital message including a first secret key;
   decrypting said first digital message at said secure digital appliance using said private key so as to obtain said first secret key;
   decrypting encrypted digital content at said secure digital appliance using said first secret key so as to obtain said digital content;
   sending a second digital message to said secure digital appliance, said second digital message encrypted with said first secret key and said second digital message including a second secret key;
   decrypting said second digital message at said secure digital appliance using said first secret key so as to obtain said second secret key; and
   wherein said step of decrypting encrypted digital content at said secure digital appliance is performed using said second secret key; and
   providing for protected output of said digital content at said secure digital appliance, said secure digital appliance not allowing for any output of said digital content other than said protected output.

6. A method for protecting digital content as recited in claim 5 further comprising:
   decoding said encrypted digital content when said digital content requires decoding.

7. A method for protecting digital content as recited in claim 6 further comprising:
   verifying that said secure digital appliance will provide adequate protection of said digital content; and
   not sending said first digital message and said digital content when said secure digital appliance is determined not to provide adequate protection of said digital content.

8. A method for protecting digital content as recited in claim 5 wherein said protected output provides for exhibition of said digital content and wherein said secure digital appliance does not contain any provision for output other than said exhibition of said digital content.

9. A method for protecting digital content as recited in claim 5 further comprising:
   sending a third digital message to said secure digital appliance, said third digital message encrypted with said second secret key and said third digital message including a third secret key;
   decrypting said third digital message at said secure digital appliance using said second secret key so as to obtain said third secret key; and
   wherein said step of decrypting encrypted digital content at said secure digital appliance is performed using said third secret key.

10. A method for protecting digital content as recited in claim 5 further comprising:
    sending a plurality of additional digital messages to said secure digital appliance that include additional secret keys, each of said additional digital messages encrypted with said first secret key;

decrypting said plurality of additional messages at said secure digital appliance using said first secret key; and herein said step of decrypting encrypted digital content further comprises decrypting digital content that is encrypted using said additional secret keys at said secure digital appliance using ones of said additional secret keys so as to obtain said digital content.

11. A method for protecting digital content as recited in claim 10 wherein said additional secret keys are used in a sequential manner to sequentially decrypt said encrypted digital content.

12. A method for protecting digital content as recited in claim 7 further comprising the step of:

when said first digital message includes one or more time stamp, only allowing the exhibition of said digital content during the time indicated by said one or more time stamp.

13. A method for assuring protection of digital content comprising the steps of:

upon receiving a request for digital content that identifies a secure digital appliance that contains a private key of a private key and public key pair, and that identifies a set-top box that contains a private key of a private key and public key pair, determining said public key for said secure digital appliance and determining said public key for said set-top box;

sending a first digital message that is encrypted with said public key for said set-top box to said set-top box, said first digital message including a first secret key, sending a second digital message that is encrypted with said public key for said secure digital appliance to said secure digital appliance, said second digital message including said first secret key, decrypting said first digital message at said set-top box using said private key for said set-top box so as to obtain said first secret key;

decrypting digital content that is encrypted using said first secret key at said set-top box so as to obtain decrypted digital content;

decoding said decrypted digital content at said set-top box so as to obtain decoded digital content;

encrypting said decoded digital content at said set-top box using said secret key and sending said encrypted decoded digital content to said secure digital appliance;

decrypting said first digital message at said secure digital appliance using said private key for said secure digital appliance so as to obtain said first secret key;

decrypting said encrypted decoded digital content at said secure digital appliance using said first secret key so as to obtain said digital content;

sending a plurality of additional digital messages to said set-top box, said plurality of additional digital messages encrypted with said first secret key and including additional secret keys;

decrypting digital content that is encrypted using said additional secret keys at said secure digital appliance using ones of said additional secret keys so as to obtain said digital content; and providing for protected output of said digital content at said secure digital appliance, said secure digital appliance not allowing for any output of said digital content other than said protected output.

14. The method of claim 13 wherein said protected output further comprises exhibiting said digital content, said secure digital appliance not allowing for any output of said digital content other than said protected output.

15. A method for protecting digital content as recited in claim 14 further comprising the step of:

verifying that said secure digital appliance and said set-top box will provide adequate protection of said digital content; and not sending said digital content when either said secure digital appliance or said set-top box are determined not to provide adequate protection of said digital content.

* * * * *